(12) United States Patent
Hall

(10) Patent No.: US 10,076,952 B2
(45) Date of Patent: Sep. 18, 2018

(54) SUNROOF UNIT

(71) Applicant: Yachiyo Industry Co., Ltd., Sayama-shi, Saitama (JP)

(72) Inventor: John Hall, Columbus, OH (US)

(73) Assignee: Yachiyo Industry Co., Ltd., Saitama (JP)

( * ) Notice: Subject to any disclaimer, the term of this patent is extended or adjusted under 35 U.S.C. 154(b) by 25 days.

(21) Appl. No.: 15/334,623

(22) Filed: Oct. 26, 2016

(65) Prior Publication Data

US 2018/0111465 A1    Apr. 26, 2018

(51) Int. Cl.
  *B60J 10/90*    (2016.01)
  *B60J 7/043*    (2006.01)
  *B60J 10/248*   (2016.01)

(52) U.S. Cl.
  CPC .............. *B60J 10/90* (2016.02); *B60J 7/0435* (2013.01); *B60J 10/248* (2016.02)

(58) Field of Classification Search
  CPC ......... B60J 10/90; B60J 10/248; B60J 7/0435
  USPC .................................................. 296/216.04
  See application file for complete search history.

(56) References Cited

U.S. PATENT DOCUMENTS

| | | | |
|---|---|---|---|
| 6,942,286 B2 * | 9/2005 | Bohm ...................... | B60J 7/047 296/216.05 |
| 8,807,641 B2 * | 8/2014 | Kikuchi .................... | B60J 7/04 296/216.09 |
| 9,114,689 B2 | 8/2015 | Dietl | |
| 2013/0307296 A1 | 11/2013 | Sawada | |

* cited by examiner

*Primary Examiner* — Joseph D. Pape
*Assistant Examiner* — Dana D Ivey
(74) *Attorney, Agent, or Firm* — Dority & Manning, P.A.

(57) ABSTRACT

In an outer slide type sunroof unit, a first seal member is mounted to a side edge of a molded part provided on an outer peripheral edge of a fixed rear panel; a second seal member is mounted to a rear edge of the molded part and has a lateral end facing forward at a position offset outward relative to a rear end of the first seal member; and a third seal member is provided on an outboard side of the first seal member. The third seal member includes a first portion for resiliently contacting an inner edge of a roof opening and a second portion that resiliently contacts the first seal member and cooperates with the first seal member to define a passage for a stay supporting a slidable front panel, a rear end of the first portion being bonded to the lateral end of the second seal member.

10 Claims, 8 Drawing Sheets

SUNROOF UNIT

TECHNICAL FIELD

The present disclosure relates to an outer slide type sunroof unit configured to be mounted to a roof of a vehicle such that a front panel slides over a rear panel.

BACKGROUND OF THE INVENTION

There is known an outer slide type sunroof device which includes a front cover and a rear cover constituting a part of a vehicle roof such that the front cover slides over the rear cover (see U.S. Pat. No. 9,114,689B). In this sunroof device, a roof seal is attached on the roof side to surround the roof opening peripherally and a cover seal is attached on the side edge of the rear cover so as to contact the roof seal, whereby the gap between the roof and the rear cover is sealed. When the front cover slides rearward over the rear cover, a lever (support member) of the mounting device of the front cover moves between the roof seal and the cover seal, so that the front cover is allowed to slide a large distance in the rearward direction.

In the sunroof device having such a structure, when installing the sunroof unit to the roof, it is necessary to attach the roof seal to the roof, which is a part of the vehicle body, and thus, the installation work is cumbersome. In other words, a structure in that the all seal members are provided on the sunroof unit is desirable. As an outer slide type sunroof unit having such a structure, a sunroof unit is known in which weather strips (seal members) each including a first seal portion for resiliently contacting an outer peripheral edge of the movable panel (front panel) or the fixed panel (rear panel) and a second seal portion for resiliently contacting an edge of the roof opening are fitted to respective vertical walls formed to stand upwardly from a guide rail or from a front housing or the like, which are part of the sunroof unit (see US2013/0307296A1). In this sunroof unit, a link member supporting the front panel moves in the fore-and-aft direction between the vertical wall and the rear panel by resiliently deforming the first seal portion.

However, in the sunroof unit disclosed in US2013/0307296A1, the seal members and the vertical walls supporting them need to be provided along the entire circumference of the front and rear panels so as to surround these panels, and thus, the seal structure is complex. Further, in a case where there is a manufacturing error in the roof, it is necessary to adjust the heights of the fixed panel and the seal members such that they are aligned with the roof, but in the sunroof unit disclosed in US2013/0307296A1, it is not possible to adjust the heights of the seal members.

SUMMARY OF THE INVENTION

In view of such background art, an object of the present invention is to provide a sunroof unit in which all seal members are provided on the sunroof unit in a simple structure and adjustment of heights of the seal members relative to the roof to which the sunroof unit is to be installed is easy to carry out.

To achieve the above object, one embodiment of the present invention provides a sunroof unit (10) for selectively opening at least a part of an opening (2a) formed in a roof (2) of a vehicle (1), the sunroof unit comprising: a frame (20) configured to be disposed below the roof so as to be aligned with the opening of the roof; a rear panel (12) secured to the frame to close a rear portion of the opening; and a front panel (11) that includes a stay (76) depending from a side portion thereof and is supported by the frame via the stay so as to be slidable between a closed position to close a front portion of the opening and an open position where the front panel overlaps on top of the rear panel to open the front portion of the opening. The rear panel includes a panel main body (16), a molded part (17) provided on an outer peripheral edge of the panel main body, and a seal portion (18) provided on an outer peripheral edge of the molded part. The seal portion includes a first seal member (41) mounted to a side edge (17b) of the molded part, a second seal member (42) mounted to a rear edge (17c) of the molded part and curved forward along a corner portion (33) of the molded part such that the second seal member has a lateral end (42a) facing forward at a position offset in an outboard direction relative to a rear end (41a) of the first seal member, and a third seal member (43) provided on an outboard side of the first seal member. The third seal member includes a first portion (61) configured to resiliently contact an inner edge of the opening of the roof and a second portion (62) that resiliently contacts an outer side of the first seal member and cooperates with the first seal member to define a passage for the stay, a rear end of the first portion (61) being bonded to the lateral end (42a) of the second seal member (42).

According to this configuration, because the first and second seal members are mounted to the molded part provided on the outer peripheral edge of the main panel body of the rear panel, there is no need to form a vertical wall on the frame to support the first and second seal members. Further, the third seal member is mounted to the main panel body of the rear panel via the rear end bonded to the second seal member. Thus, the all seal members are provided on the sunroof unit in a simple structure. In addition, in the above configuration, not only the positions (heights) of the first and second seal members relative to the panel main body but also the position (height) of the third seal member relative to the panel main body is fixed. Therefore, when the height of the panel main body of the rear panel relative to the frame is adjusted such that the panel main body is aligned with the roof of the vehicle to which the sunroof unit is installed, the heights of the first to third seal members are automatically adjusted, and therefore, the height adjustment can be carried out easily.

Preferably, in the above configuration, an outer edge of the rear end of the first portion (61) of the third seal member (43) is aligned with an outer edge of the lateral end (42a) of the second seal member (42).

According to this configuration, it is ensured that the outer edges of the third seal member and the second seal member at the connection therebetween tightly contact the inner edge of the opening of the roof, and thus, the sealing performance at the connection between the third seal member and the second seal member is improved.

Preferably, in the above configuration, the rear end of the first portion (61) of the third seal member (43) is bonded to the lateral end (42a) of the second seal member (42) by welding.

According to this configuration, the third seal member and the second seal member are bonded to each other firmly and reliably.

Preferably, in the above configuration, the first portion (61) and the second portion (62) of the third seal member (43) are formed to be symmetric to each other.

According to this configuration, arrangement of the third seal member is easy because the direction of arrangement of the third seal member is not limited.

Preferably, in the above configuration, the side portion (31) of the molded part (17) is provided with a cutout (35) extending from a position that coincides with the lateral end (42a) of the second seal member (42) to a front edge (17a) of the molded part (17), and the first seal member (41) is disposed in the cutout.

According to this configuration, the width of the lateral end of the second seal member can be reduced, and therefore, the panel main body can be made larger correspondingly.

Preferably, in the above configuration, the second portion (62) of the third seal member (43) is disposed in the cutout (35).

According to this configuration, the width of the lateral end of the second seal member can be reduced further, and thus, the panel main body can be made even larger correspondingly.

Preferably, in the above configuration, the rear panel (12) is mounted to the frame (20) such that a height of the rear panel is adjustable.

According to this configuration, in a case where there is a manufacturing error in the roof, the height of the rear panel relative to the frame can be adjusted such that the rear panel is aligned with the roof. Therefore, it is unnecessary to adjust the height of the frame relative to the roof, and thus, the installation of the sunroof unit to the roof is easy to carry out.

Preferably, in the above configuration, the third seal member (43) is supported by a support bracket (70) mounted to the frame (20), wherein a height of the support bracket is adjustable.

According to this configuration, the support rigidity of the third seal member is improved, and thus, the reliability of the seal is improved.

Preferably, in the above configuration, the frame (20) includes a guide rail (24) for guiding the front panel (11) via the stay (76), and the support bracket (70) includes a lower end portion (71) secured to the frame (20) at a position on an outboard side of the guide rail, an intermediate portion (72) extending from the lower end portion in an inboard direction, and an upper end portion (73) extending upward from the intermediate portion and supporting the third seal member (43) above the guide rail.

According to this configuration, it is possible to prevent the support bracket from interfering with the movement of the front panel.

Preferably, in the above configuration, the support bracket (70) is constituted of a plate member bent along bend lines (74) each extending in a fore-and-aft direction.

According to this configuration, the support bracket can be manufactured easily by processing a plate member to have a desired cross-sectional shape. In addition, by using a plate member with a length necessary to support the third seal member, it is possible to manufacture a support bracket in accordance with the length of the third seal member.

Thus, according to the foregoing configuration, it is possible to provide a sunroof unit in which all seal members are provided on the sunroof unit in a simple structure, and adjustment of heights of the seal members relative to the roof to which the sunroof unit is to be installed is easy to carry out.

DETAILED DESCRIPTION OF THE PREFERRED EMBODIMENTS

In the following, an embodiment of the present invention will be described in detail with reference to the drawings.

Figure 1:
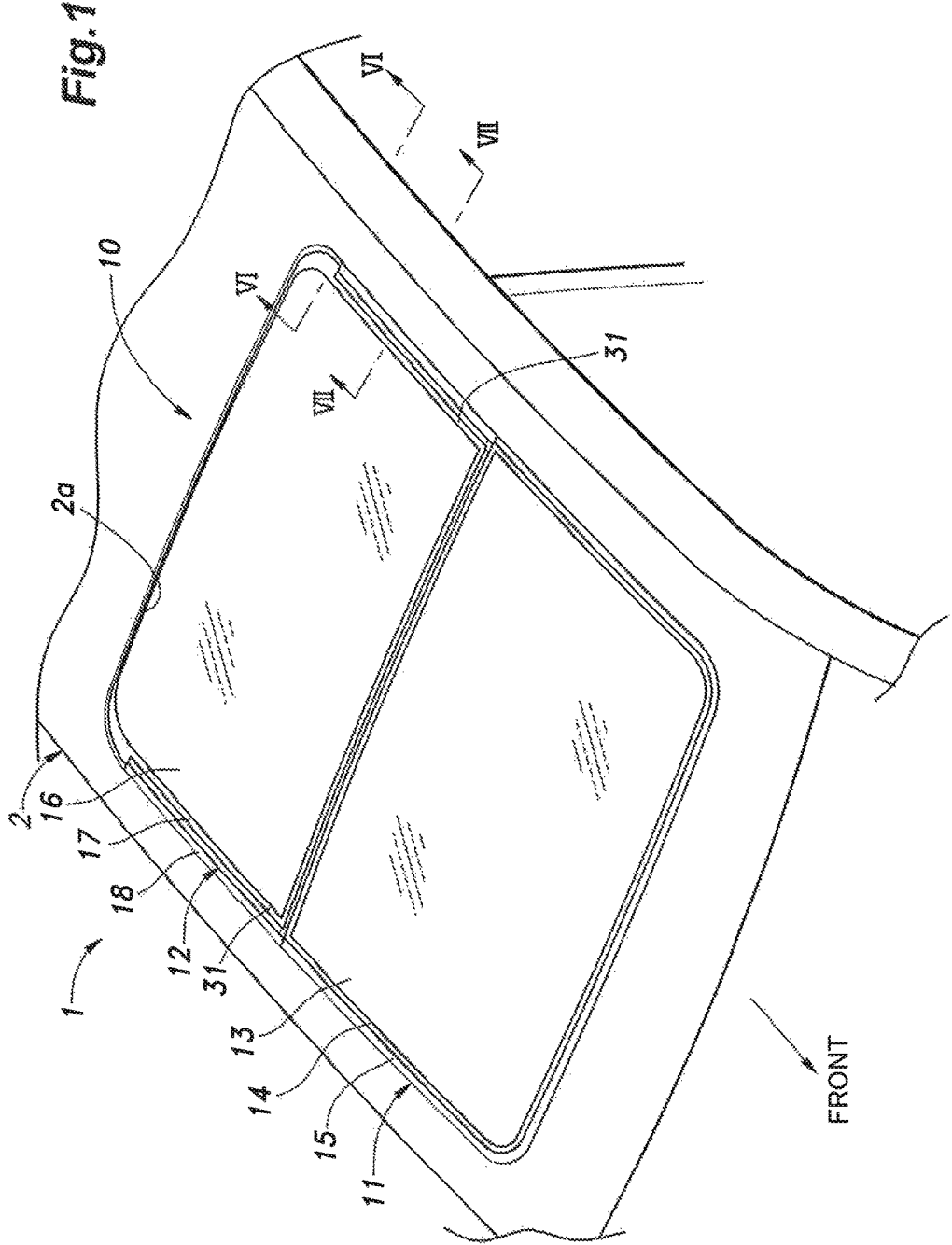
FIG. 1 is a perspective view showing a closed state of a sunroof unit installed on to a roof.

FIG. 1 is a perspective view showing a closed state of a sunroof unit 10 installed to a roof 2 of a motor vehicle 1. A rectangular opening 2a is formed in the roof 2 of the motor vehicle 1, and the sunroof unit 10 is installed to the roof 2 to close the opening 2a. In the following description, the directions such as front, rear, left, right, up, and down are defined with respect to the motor vehicle 1. With respect to the vehicle width direction of the motor vehicle 1, which corresponds to the lateral direction, a side closer to the center of the motor vehicle 1 may be referred to as an inboard side, and an outer side of the motor vehicle 1 may be referred to as an outboard side. The sunroof unit 10 is substantially left and right symmetric, and the details of the symmetric structures will be described while showing the structures on the left side in the drawings.

The sunroof unit 10 includes a front panel 11 for closing a front portion of the opening 2a and a rear panel 12 for closing a rear portion of the opening 2a. The front panel 11 and the rear panel 12 are arranged along the roof 2 such that their upper surfaces are aligned with the upper surface of the roof 2. The front panel 11 is a movable panel that is movable relative to the roof 2, while the rear panel 12 is a fixed panel that is not movable relative to the roof 2.

The front panel 11 includes a front panel main body 13 formed of a glass plate, an annular front molded part 14 made of resin and provided on an outer peripheral edge of the front panel main body 13, and a front seal portion 15 made of an elastic material and provided on an outer peripheral edge of the front molded part 14. The rear panel 12 includes a rear panel main body 16 formed of a glass plate, an annular rear molded part 17 made of resin and provided on an outer peripheral edge of the rear panel main body 16, and a rear seal portion 18 made of an elastic material and provided on an outer peripheral edge of the rear molded part 17. The front seal portion 15 and the rear seal portion 18 cooperate with each other to form an annular seal portion around an outer circumference of the front panel 11 and the rear panel 12 and to form a seal portion between the front panel 11 and the rear panel 12.

In this embodiment, the front seal portion 15 is provided to extend along both side edges and the front edge of the front molded part 14 (these edges are part of the outer peripheral edge of the front molded part 14) and has a U-shape. On the other hand, the rear seal portion 18 is provided to extend annularly along the entire outer peripheral edge of the rear molded part 17. Namely, the seal portion between the front panel 11 and the rear panel 12 is formed as a part of the rear seal portion 18. In another embodiment, the seal portion between the front panel 11 and the rear panel 12 may be formed as a part of the front seal portion 15.

Figure 2:
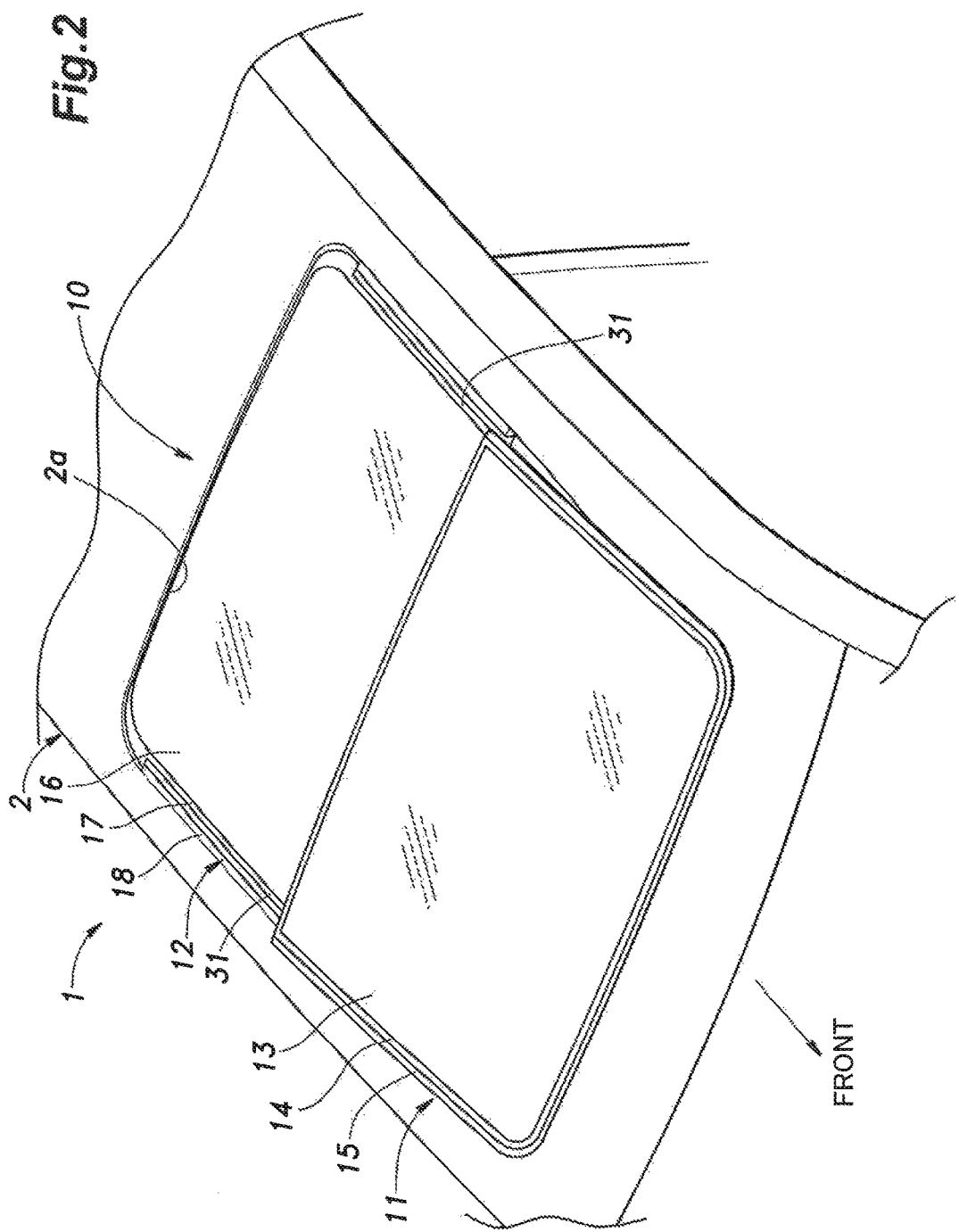
FIG. 2 is a perspective view showing a tilt-up state of the sunroof unit shown in FIG. 1.
Figure 3:
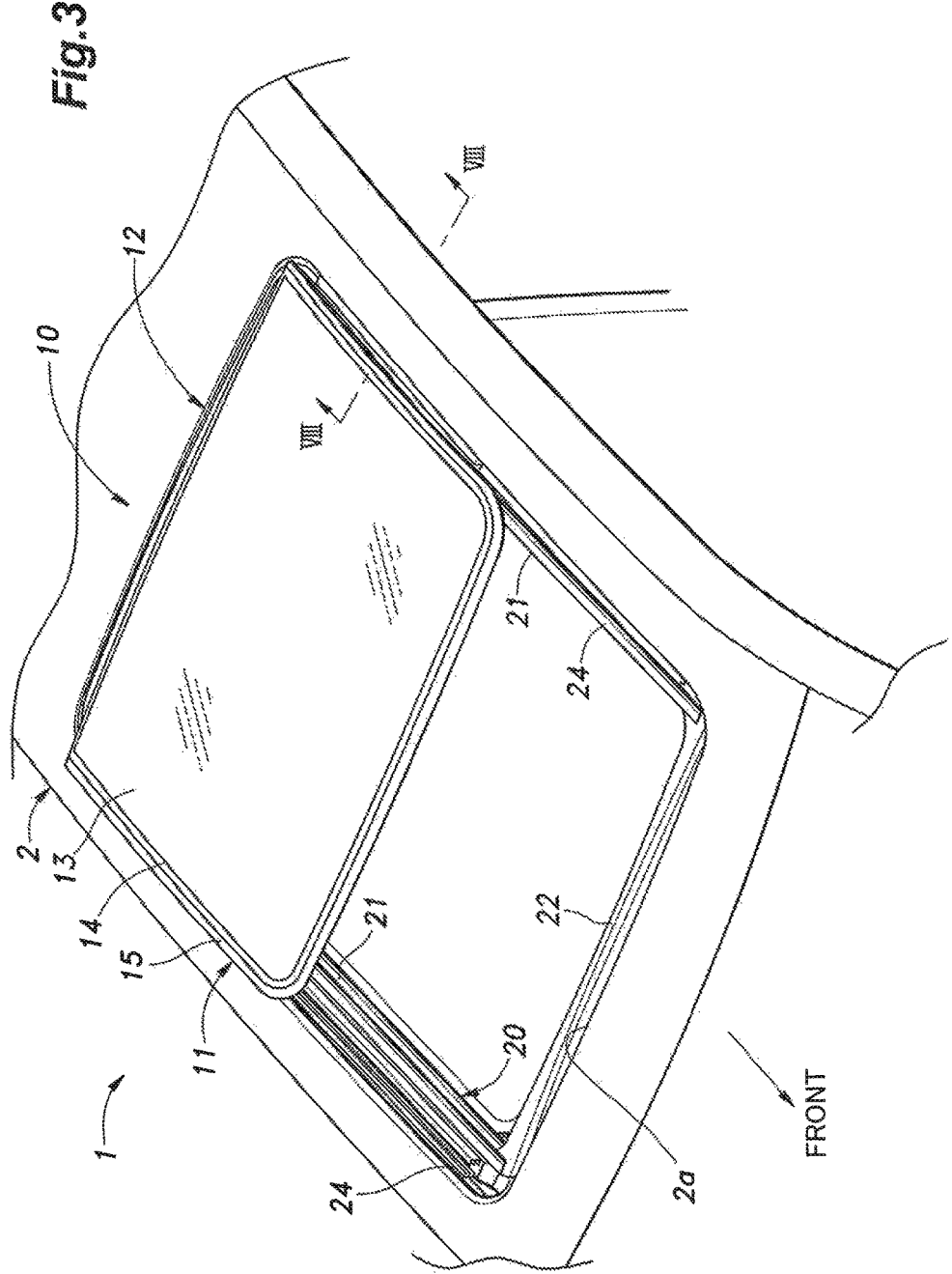
FIG. 3 is a perspective view showing an open state of the sunroof unit shown in FIG. 1.

When driven by a known slide mechanism in an opening direction, the front panel 11 is moved from a closed position shown in FIG. 1, at which the front panel 11 closes the front portion of the opening 2a, to a tilt-up position shown in FIG. 2, at which the rear portion of the front panel 11 is raised, and then, slides over the rear panel 12 rearward to move to an open position shown in FIG. 3, at which the front panel 11 overlaps on top of the rear panel 12 and opens the front portion of the opening 2a. On the other hand, when driven by the slide mechanism in a closing direction, the front panel 11 slides forward over the rear panel 12 from the open position shown in FIG. 3 to the closed position shown in FIG. 1 via the tilt-up position shown in FIG. 2. Thus, the front panel 11 is configured to be slidable between the closed position shown in FIG. 1 and the open position shown in FIG. 3, and the sunroof unit 10 can selectively open the front portion of the opening 2a.

As shown in FIG. 3, a frame 20 that supports the front panel 11 and the rear panel 12 is mounted below the roof panel 3 such that the frame 20 is aligned with the opening 2a of the roof 2. The frame 20 is formed to have an annular shape extending along the inner peripheral edge of the opening 2a, and includes left and right side frames 21 extending in the fore-and-aft direction along the respective inner side edges of the opening 2a, a front frame 22 (FIG. 4) connecting the front ends of the left and right side frames 21 to each other, and a rear frame 23 (FIG. 4) connecting the rear ends of the left and right side frames 21 to each other. Each side frame 21 is integrally provided with a guide rail 24 extending in the fore-and-aft direction.

Figure 4:
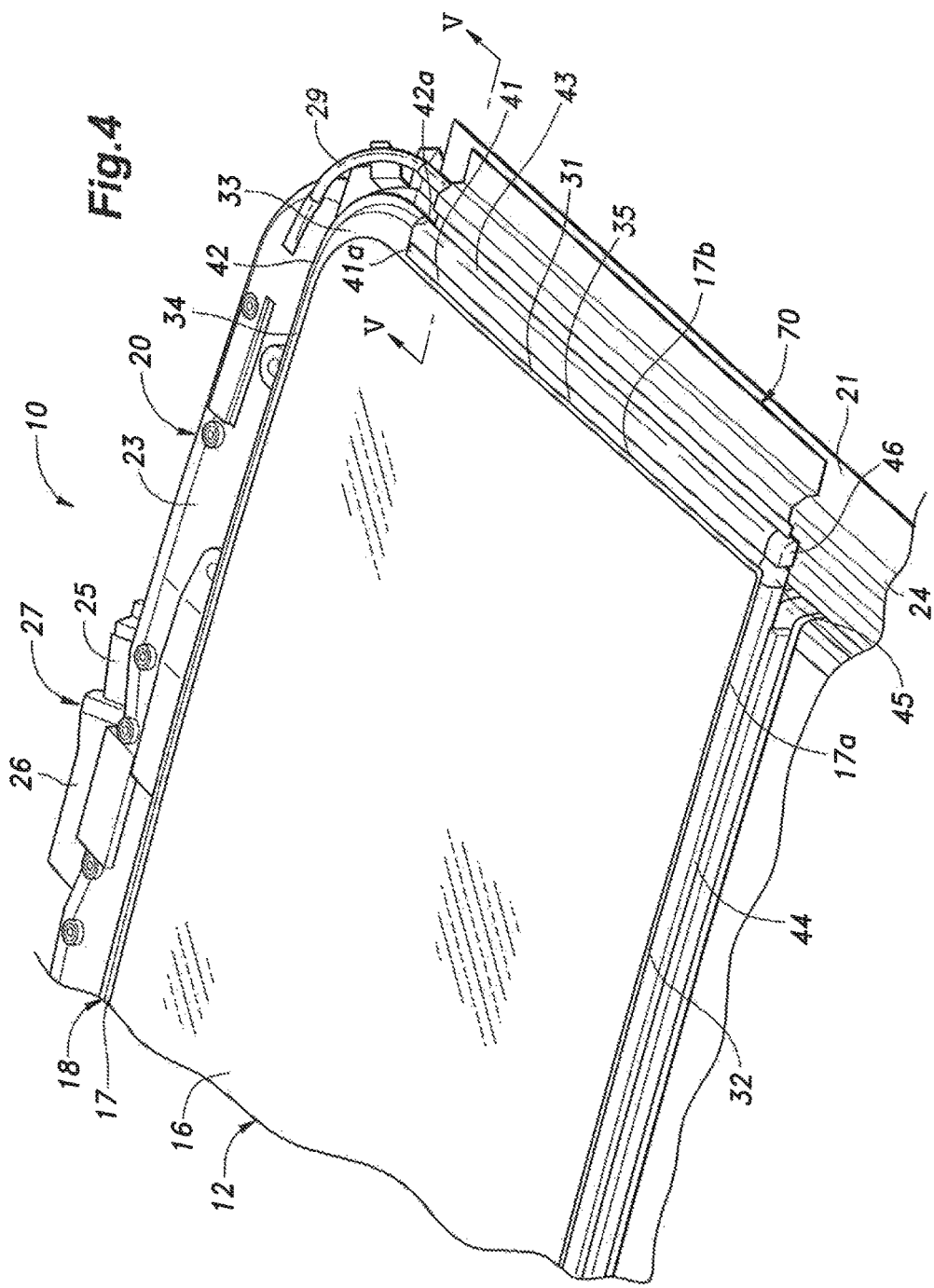
FIG. 4 is a perspective view showing a part of the sunroof unit before being installed to the roof.

FIG. 4 is a perspective view showing a part of the sunroof unit 10 before being installed to the roof 2. As shown in FIG. 4, a drive source 27 including an electric motor 25 and a reduction mechanism 26 is mounted at an intermediate portion of the rear frame 23 in the lateral direction. The output end of the drive source 27 is engaged with left and right push-pull cables 28 (FIG. 5) for driving the front panel 11. The push-pull cables 28 extend from the output end of the drive source 27 along the rear frame 23 in the outboard direction, are passed through left and right guide pipes 29 to be curved forward, and then extend forward in the left and right guide rails 24, respectively.

The rear panel main body 16 has a substantially rectangular shape, with the rear left and right corners thereof being rounded. The rear molded part 17 includes left and right side portions 31 (FIG. 1) extending in the fore-and-aft direction along left and right outer side edges of the rear panel main body 16, respectively, a front portion 32 connecting the front ends of the left and right side portions 31 to each other, and a rear portion 34 connecting the rear ends of the left and right side portions 31 to each other via left and right curved corner portions 33.

Figure 5:
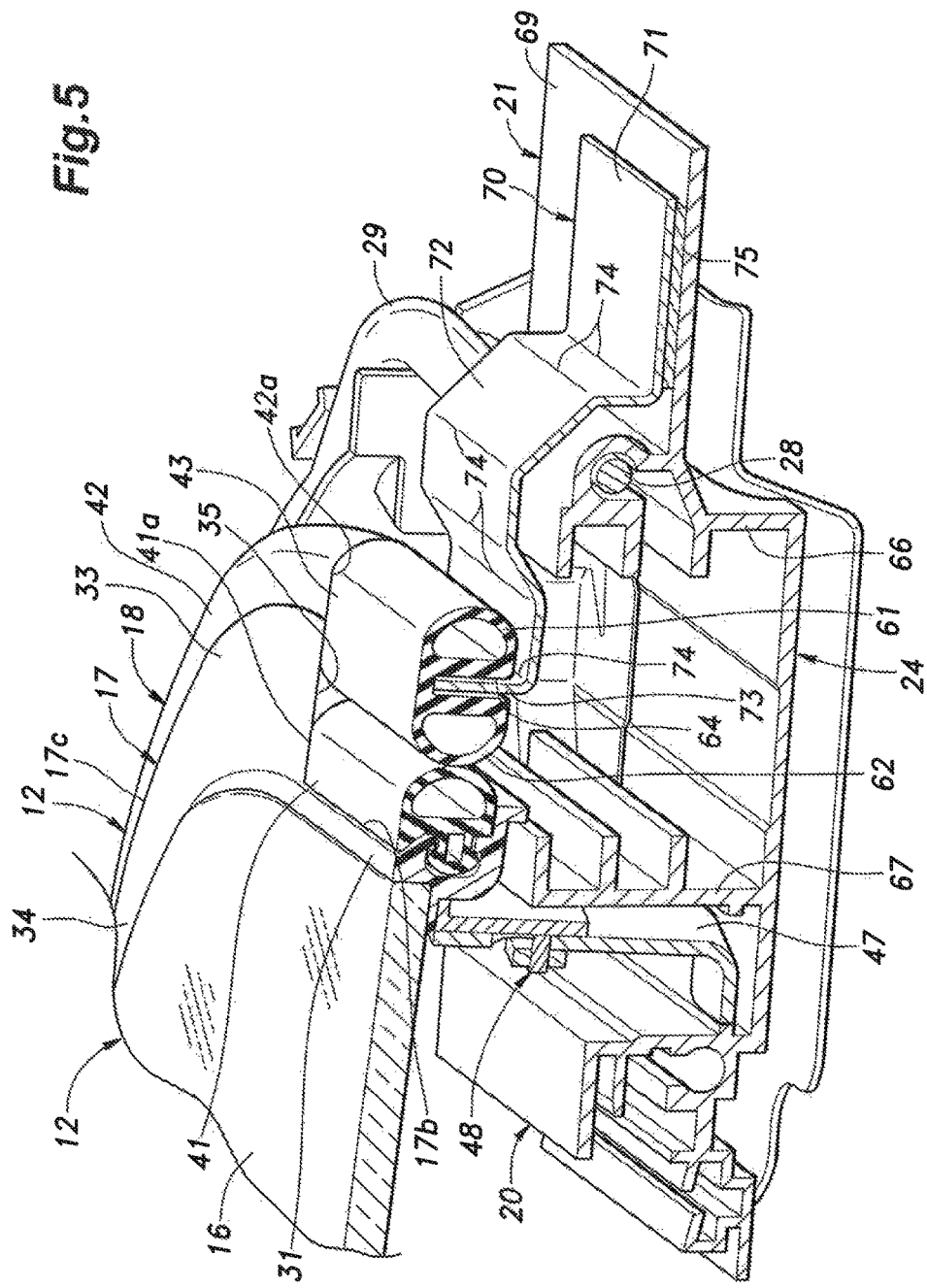
FIG. 5 is an enlarged perspective view showing a detailed structure of the sunroof unit, with a part thereof broken away along line V-V in FIG. 4.

FIG. 5 is an enlarged perspective view showing a detailed structure of the sunroof unit 10, with a part thereof broken away along line V-V in FIG. 4. As shown in FIGS. 4 and 5, each of the left and right side portions 31 of the rear molded part 17 has a smaller width than the front end of the associated corner portion 33 and is connected to an inboard-side part of the front end of the corner portion 33. In other words, each side portion 31 of the rear molded part 17 is provided with a cutout 35 that extends in the fore-and-aft direction from the front end of the associated corner portion 33 to the front edge 17a of the rear molded part 17. The inboard-side edge of the cutout 35 extending in the fore-and-aft direction makes a side edge 17b of the rear molded part 17 (outer edge of the side portion 31).

The rear seal portion 18 includes a pair of first seal members 41 respectively extending along the left and right side edges 17b of the rear molded part 17, a second seal member 42 extending along the rear edge 17c of the rear molded part 17 and curved forward along the corner portions 33 of the rear molded part 17, a pair of third seal members 43 extending along the outer sides of the respective first seal members 41, and a fourth seal member 44 (FIG. 4) extending along the front edge 17a of the rear molded part 17.

The front ends of the left and right first seal members 41 are connected with each other by the fourth seal member 44 via left and right corner members 45 (FIG. 4) each bent at a right angle. Each first seal member 41 extends in the fore-and-aft direction in the associated cutout 35 and the rear end 41a thereof is positioned at the rear end of the cutout 35.

The second seal member 42 has lateral ends 42a each facing forward at a position offset in the outboard direction relative to the front end of the associated corner portion 33 of the rear molded part 17, namely, relative to the rear end 41a of the associated first seal member 41. In other words, each cutout 35 is formed to extend from a position that coincides with the associated lateral end 42a of the second seal member 42 to the front edge 17a of the rear molded part 17.

Each third seal member 43 is provided on the frame 20 such that the outer end thereof is aligned with the outer end of the associated lateral end 42a of the second seal member 42. Specifically, each third seal member 43 is mounted to the frame 20 via an associated one of left and right support bracket 70 respectively attached to the left and right side frames 21, and is disposed such that only an inner portion thereof (second portion 62, which will be described later) extends in the fore-and-aft direction in the cutout 35. The detailed structure of the third seal member 43 will be described later. An end member 46 (FIG. 4) is welded to the front end of each third seal member 43. The rear end of each third seal member 43 is bonded to the associated lateral end 42a of the second seal member 42 at least partially.

As shown in FIG. 5, the rear panel 12 is secured to the frame 20 by means of support posts 47 that extend downward from the four corners of the rear molded part 17. Each support post 47 is provided with a height adjustment mechanism 48 of a known structure. Namely, the rear panel 12 is mounted to the frame 20 such that the height of the rear panel 12 is adjustable.

Figure 6:
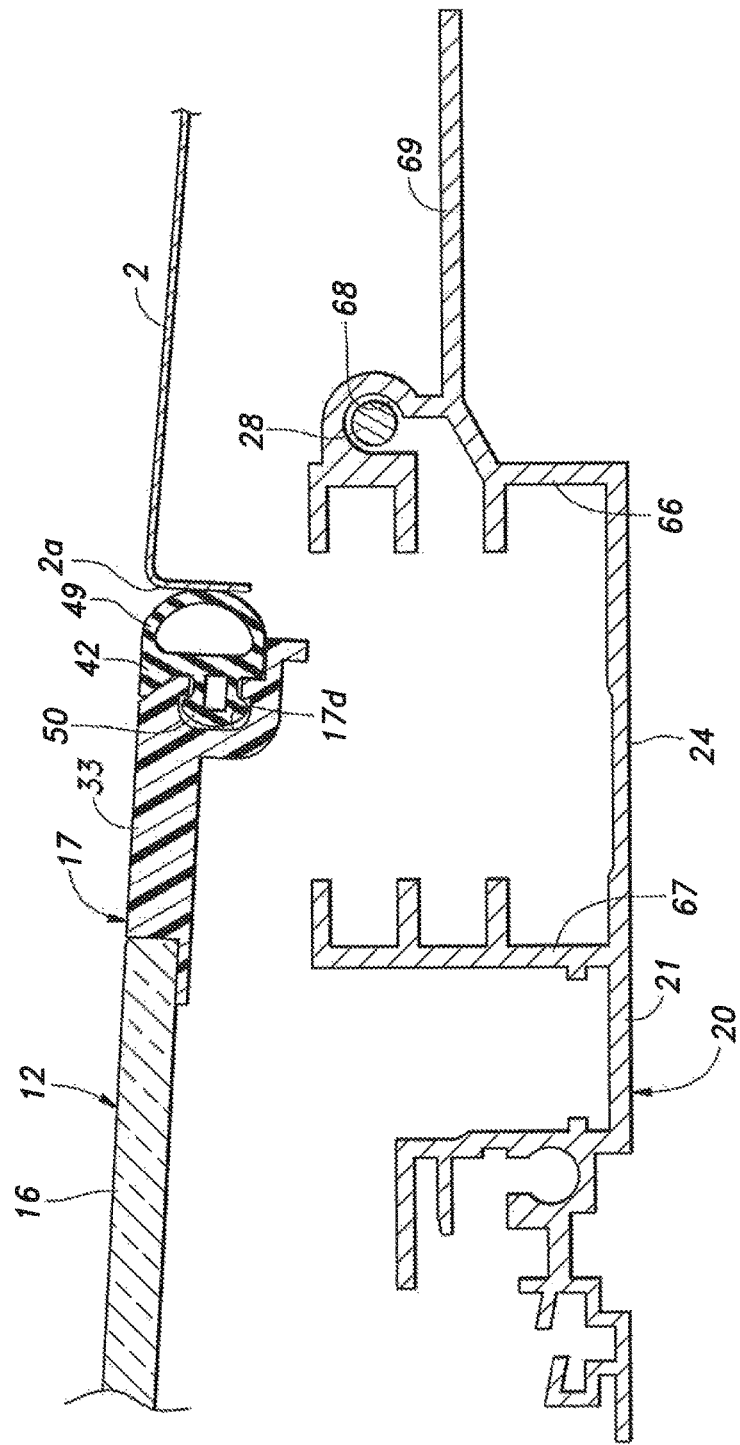
FIG. 6 is a cross-sectional view taken along line VI-VI in FIG. 1.

FIG. 6 is a cross-sectional view taken along line VI-VI in FIG. 1. As shown in FIG. 6, the second seal member 42 is an extrusion molded product made of an elastic material, and has a constant cross-sectional shape. The second seal member 42 includes a main body 49 in the shape of letter D convex in the outboard direction and a fitting portion 50 formed integrally on the inboard side of the main body 49 so as to be fitted in a mounting groove 17d formed in the peripheral edge of the rear molded part 17. The main body 49 of the second seal member 42 resiliently contacts the inner edge of the opening 2a of the roof 2.

Figure 7:
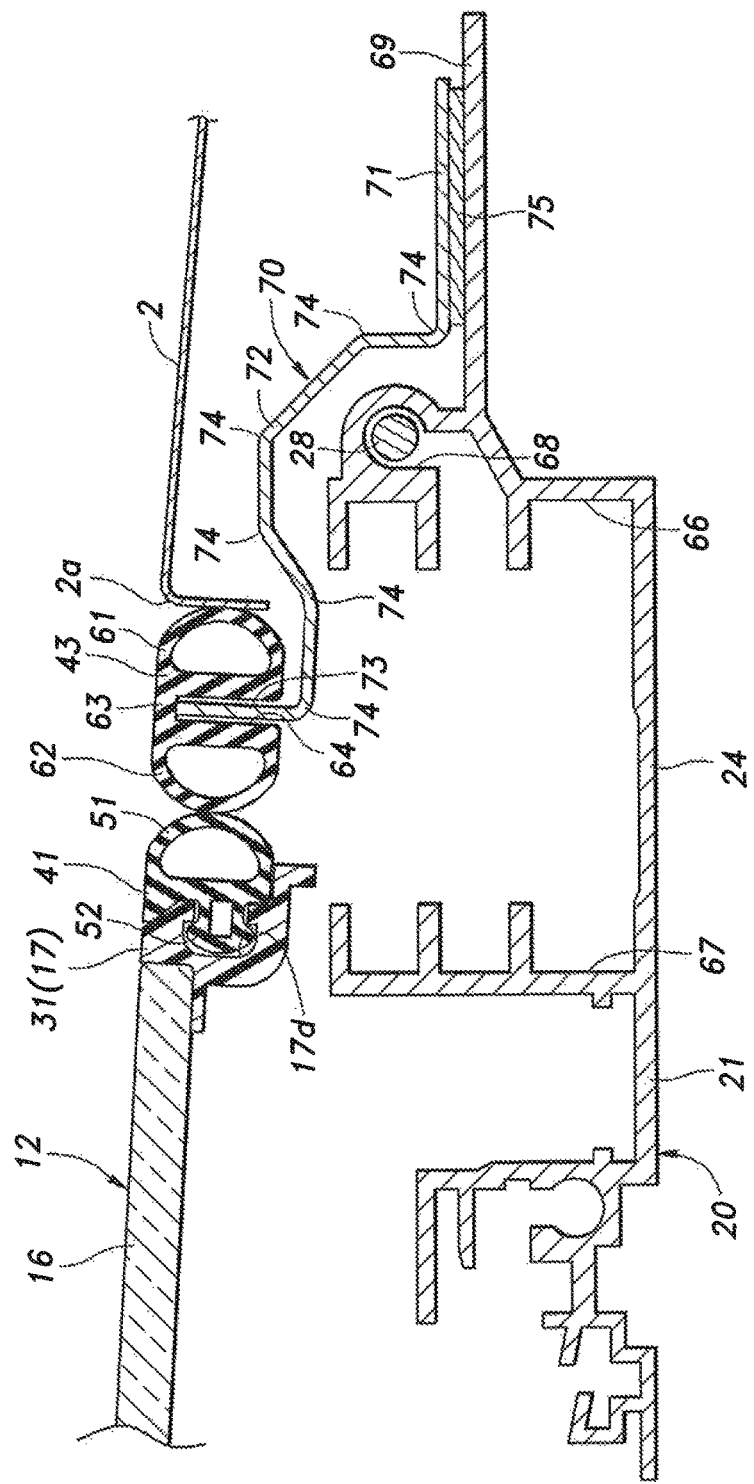
FIG. 7 is a cross-sectional view taken along line VII-VII in FIG. 1.

FIG. 7 is a cross-sectional view taken along line VII-VII in FIG. 1. As shown in FIG. 7, similarly to the second seal member 42, each first seal member 41 is an extrusion molded product made of an elastic material, and has a constant cross-sectional shape. The first seal member 41 includes a main body 51 in the shape of letter D convex in the outboard direction and a fitting portion 52 formed integrally on the inboard side of the main body 49 so as to be fitted in the mounting groove 17d of the rear molded part 17.

Each third seal member 43 includes a first portion 61 in the shape of letter D convex in the outboard direction and a second portion 62 in the shape of letter D convex in the inboard direction, where the second portion 62 is connected with an upper part of the first portion 61 via a connecting portion 63. The first portion 61, the second portion 62, and the connecting portion 63 are formed integrally with each other. The first portion 61 has a cross-sectional shape substantially the same as that of the main body 49 of the second seal member 42 (FIG. 6), and the entirety of the rear end thereof is bonded to the associated lateral end 42a of the second seal member 42 by welding. The first portion 61 and the second portion 62 are formed to be symmetric to each other, and a mounting groove 64 opening out on the underside of the third seal member 43 is defined below the connecting portion 63 that connects the first and second portions 61, 62.

Each side frame 21 is an extrusion molded product made of an aluminum alloy, and has a pair of guide portions 66, 67 for guiding a slider 80 (FIG. 8) from both left and right sides. The pair of guide portions is constituted of an outer guide portion 66 disposed on the outboard side and an inner guide portion 67 disposed on the inboard side. The outer guide portion 66 is provided with a cable guide groove 68 for guiding the push-pull cable 28. An extending portion 69 is formed integrally at an intermediate part of the outer guide portion 66 in the height direction so as to extend out in the outboard direction.

As shown in FIGS. 4 and 5, each support bracket 70 is a press-formed product produced by press-forming a steel plate, has a fore-and-aft length substantially the same as that of the third seal member 43, and has an identical cross-sectional shape over its entire length.

As shown in FIGS. 5 and 7, the support bracket 70 extends in the lateral direction such that the support bracket 70 includes a lower end portion 71 secured to the extending portion 69 of the side frame 21 at a part on the outboard side of the pair of guide portions 66, 67, an intermediate portion 72 that is bent upward at the inboard-side end of the lower end portion 71 and further bent inward to extend in the inboard direction across above the outer guide portion 66, and an upper end portion 73 that is bent upward at the inboard-side end of the intermediate portion 72 to extend upward from the intermediate portion and supports the third seal member 43 between the first seal member 41 and the inner edge of the opening 2a of the roof 2 opposing the first seal member 41. The plurality of bent portions including the bent portion between the lower end portion 71 and the intermediate portion 72, the bent portion between the intermediate portion 72 and the upper end portion 73, and the multiple bent portions formed in the intermediate portion 72, constitute bend lines 74 each extending in the fore-and-aft direction. Namely, the support bracket 70 is formed of a plate member bent along bend lines 74 each extending in the fore-and-aft direction. The lower end portion 71 is secured to the extending portion 69 of the side frame 21 by any known securing means such as a bolt and nut. The height of the support bracket 70 is adjustable by inserting a shim 75 having an appropriate thickness between the lower end portion 71 and the extending portion 69. It is to be noted that when the height adjustment is unnecessary, the shim 75 may not be inserted.

The third seal member 43 is mounted to the support bracket 70 such that the upper end portion 73 is received in the mounting groove 64, and is secured to the support bracket 70 with the first portion 61 and the second portion 62 being bonded to the upper end portion 73 with an adhesive. In the state where the third seal member 43 is mounted to the support bracket 70, the first portion 61 resiliently contacts the inner edge of the opening 2a the roof panel 3 (FIG. 7), and the second portion 62 resiliently contacts the outer side of the first seal member 41.

Figure 8:
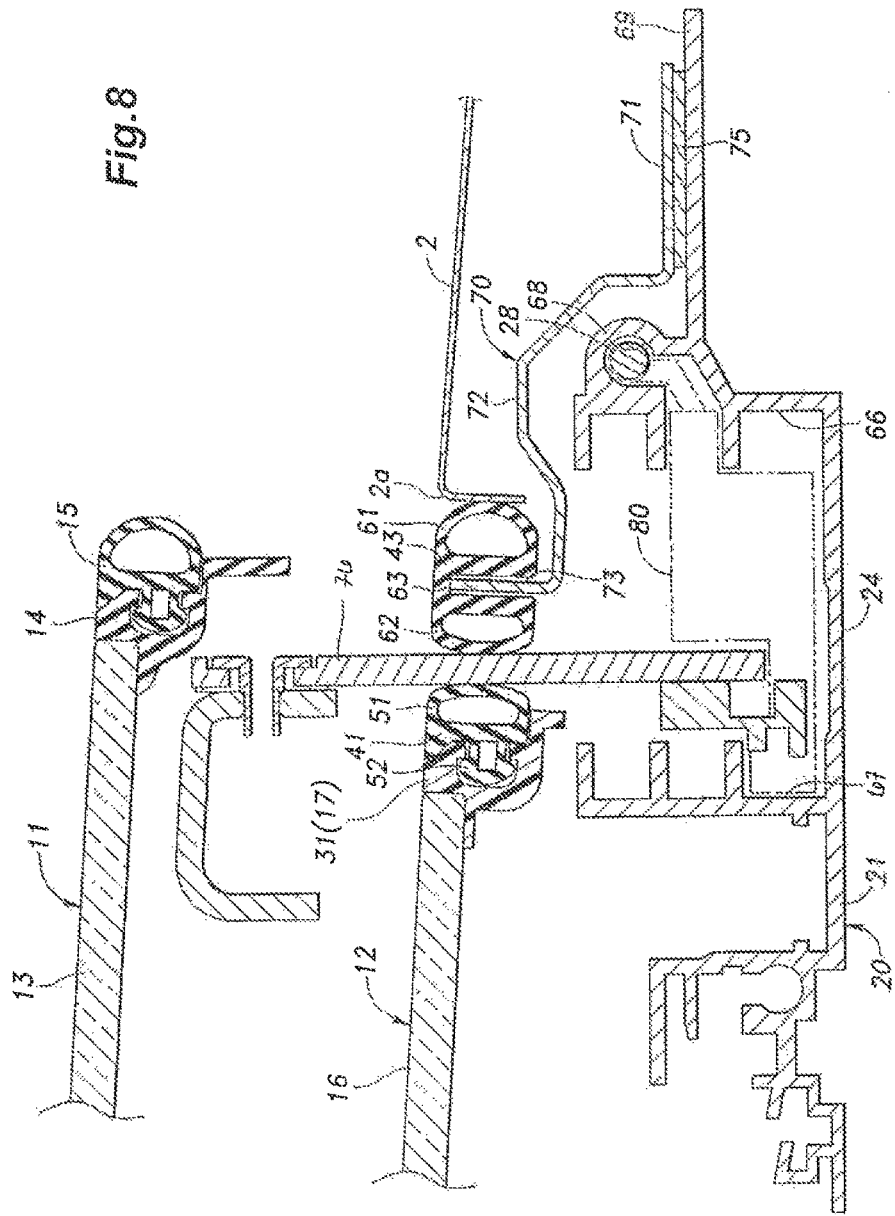
FIG. 8 is a cross-sectional view taken along line VIII-VIII in FIG. 3, which is a cross-sectional view corresponding to FIG. 7 but showing the sunroof unit in the open state.

FIG. 8 is a cross-sectional view taken along line VIII-VIII in FIG. 3, which is a cross-sectional view corresponding to FIG. 7 but showing the sunroof unit 10 in the open state. As shown in FIG. 8, the front panel 11 includes a pair of stays 76 depending from left and right side portions thereof, respectively, and is guided by the guide rails 24 via a pair of sliders 80 supporting the respective stays 76, whereby the front panel 11 is slidably supported by the frame 20 via the stays 76 and the sliders 80. When the front panel 11 is moved from the tilt-up position shown in FIG. 2 to the open position shown in FIG. 3, each stay 76 lifting up the rear portion of the front panel 11 enters between the first seal member 41 and the second portion 62 of the third seal member 43 on the same lateral side of the sunroof unit 10. Namely, the second portion 62 of the third seal member 43 cooperates with the first seal member 41 to define a passage for the stay 76.

The sunroof unit 10 is configured as described above. In the following, The operation and effect of the sunroof unit 10 will be described.

As shown in FIG. 5, the rear seal portion 18 includes a first seal member 41 mounted to the side edge 17b of the rear molded part 17, a second seal member 42 mounted to the rear edge 17c of the rear molded part 17 and curved forward along the corner portion 33 of the rear molded part 17 such that the second seal member 42 has a lateral end 42a facing forward at a position offset in the outboard direction relative to the rear end 41a of the first seal member 41, and a third seal member 43 provided on the outboard side of the first seal member 41. Thus, the first to third seal members 41-43 are all provided on the sunroof unit 10, and therefore, installation of the sunroof unit 10 to the roof 2 is easy to carry out. Further, because the first and second seal members 41, 42 are mounted to the rear molded part 17 provided on the outer peripheral edge of the rear panel main body 16 of the rear panel 12, there is no need to form a vertical wall on the frame 20 to support the first and second seal members, 41, 42, and thus, the seal structure is simple.

Further, as shown in FIG. 8, the third seal member 43 includes a first portion 61 configured to resiliently contact the inner edge of the opening 2a of the roof 2 and a second portion 62 that resiliently contacts the outer side of the first seal member 41 and cooperates with the first seal member 41 to define a passage for the stay 76. Thereby, the stay 76, which depends from the side portion of the front panel 11, can pass through the passage between the first seal member 41 and the second portion 62 of the third seal member 43, and therefore, the front panel 11 is allowed to slide a large distance in the rearward direction, as shown in FIG. 3.

Further, as shown in FIG. 5, the rear end of the first portion 61 of the third seal member 43 is bonded to the lateral end 42a of the second seal member 42. Thereby, not only the positions (heights) of the first and second seal members 41, 42 relative to the rear panel main body 16 but also the position (height) of the third seal member 43 relative to the rear panel main body 16 is fixed. Therefore, when the height of the rear panel main body 16 relative to the frame 20 is adjusted such that the rear panel main body 16 is aligned with the roof 2 of the vehicle 1 to which the sunroof unit 10 is installed, the heights of the first to third seal members 41-43 are automatically adjusted, and therefore, the height adjustment can be carried out easily.

As described above, the outer edge of the rear end of the first portion 61 of the third seal member 43 is aligned with the outer edge of the lateral end 42a of the second seal member 42. Thereby, it is ensured that the outer edges of the third seal member 43 and the second seal member 42 at the connection therebetween tightly contact the inner edge of the opening 2a of the roof 2, and thus, the sealing performance at the connection between the third seal member 43 and the second seal member 42 is improved.

In the illustrated embodiment, the rear end of the first portion 61 of the third seal member 43 is bonded to the lateral ends 42a of the second seal member 42 by welding. Thereby, the third seal member 43 and the second seal member 42 are bonded to each other firmly and reliably.

The first portion 61 and the second portion 62 of the third seal member 43 are formed to be symmetric to each other. Thereby, the direction of arrangement of the third seal member 43 is not limited, and therefore, arrangement of the third seal member 43 is easy.

The side portion 31 of the rear molded part 17 is provided with a cutout 35 extending from the position that coincides with the lateral ends 42a of the second seal member 42 to the front edge 17a (FIG. 4) of the rear molded part 17, and the first seal member 41 is disposed in the cutout 35. Thereby, the width of the lateral end 42a of the second seal member 42 can be reduced, and therefore, the rear panel main body 16 can be made larger correspondingly.

Further, in addition to the first seal member 41, the second portion 62 of the third seal member 43 also is disposed in the cutout 35. Thereby, the width of the lateral ends 42a of the second seal member 42 can be reduced further, and thus, the rear panel main body 16 can be made even larger correspondingly.

The rear panel 12 is mounted to the frame 20 by the support post 47 such that the height of the rear panel 12 is adjustable. Thereby, in a case where there is a manufacturing error in the roof 2, the height of the rear panel 12 relative to the frame 20 can be adjusted such that the rear panel 12 is aligned with the roof 2. Therefore, it is unnecessary to adjust the height of the frame 20 relative to the roof 2, and thus, the installation of the sunroof unit 10 to the roof 2 is easy to carry out.

Further, the third seal member 43 is supported by the support bracket 70 mounted to the frame 20, wherein a height of the support bracket 70 is adjustable. Thereby, the support rigidity of the third seal member is improved, and thus, the reliability of the seal is improved.

The frame 20 includes a guide rail 24 for guiding the front panel 11 via the stay 76. Further, the support bracket 70 includes a lower end portion 71 secured to the frame 20 at a position on an outboard side of the guide rail 24, an intermediate portion 72 extending from the lower end portion 71 in an inboard direction, and an upper end portion 73 extending upward from the intermediate portion 72 and supporting the third seal member 43 above the guide rail 24. Thereby, it is possible to prevent the support bracket 70 from interfering with the movement of the front panel 11, as shown in FIG. 8.

As shown in FIGS. 5 and 7, the support bracket 70 is constituted of a plate member bent along bend lines 74 each extending in the fore-and-aft direction. Thereby, the support bracket 70 can be manufactured easily by processing a plate member to have a desired cross-sectional shape. In addition, by using a plate member with a length necessary to support the third seal member 43, it is possible to manufacture a support bracket 70 in accordance with the length of the third seal member 43.

The description of the concrete embodiment has been provided in the foregoing, but the present invention is not limited to the foregoing embodiment and can be carried out with various modifications and alterations. For example the concrete structure, arrangement, number, material, etc. of the members or parts may be changed appropriately without exceeding the spirit of the present invention. It is also to be noted that not all of the component parts shown in the foregoing embodiment are necessarily indispensable, and they may be selectively used as appropriate. For example, in the foregoing embodiment, some of the component parts, such as the guide rails, stays, first seal members, third seal members, etc. are provided symmetrically on both left and right sides of the sunroof unit, but they may be provided on only one lateral side.

The invention claimed is:

1. A sunroof unit for selectively opening at east a part of an opening formed in a roof of a vehicle, the sunroof unit comprising:
    a frame configured to be disposed below the roof so as to be aligned with the opening of the roof;
    a rear panel secured to the frame to close a rear portion of the opening; and
    a front panel that includes a stay depending from a side portion thereof and is supported by the frame via the stay so as to be slidable between a closed position to close a front portion of the opening and an open position where the front panel overlaps on top of the rear panel to open the front portion of the opening,
    wherein:
    the rear panel includes a panel main body, a molded part provided on an outer peripheral edge of the panel main body, and a seal portion provided on an outer peripheral edge of the molded part;
    the seal portion includes a first seal member mounted to a side edge of the molded part, a second seal member mounted to a rear edge of the molded part and curved forward along a corner portion of the molded part such that the second seal member has a lateral end facing forward at a position offset in an outboard direction relative to a rear end of the first seal member, and a third seal member provided on an outboard side of the first seal member; and
    the third seal member includes a first portion configured to resiliently contact an inner edge of the opening of the roof and a second portion that resiliently contacts an outer side of the first seal member and cooperates with the first seal member to define a passage for the stay, a rear end of the first portion being bonded to the lateral end of the second seal member.

2. The sunroof unit according to claim 1, wherein an outer edge of the rear end of the first portion of the third seal member is aligned with an outer edge of the lateral end of the second seal member.

3. The sunroof unit according to claim 2, wherein the rear end of the first portion of the third seal member is bonded to the lateral end of the second seal member by welding.

4. The sunroof unit according to claim 1, wherein the first portion and the second portion of the third seal member are formed to be symmetric to each other.

5. The sunroof unit according to claim 1, wherein the side portion of the molded part is provided with a cutout extending from a position that coincides with the lateral end of the second seal member to a front edge of the molded part, and the first seal member is disposed in the cutout.

6. The sunroof unit according to claim 5, wherein the second portion of the third seal member is disposed in the cutout.

7. The sunroof unit according to claim 1, wherein the rear panel is mounted to the frame such that a height of the rear panel is adjustable.

8. The sunroof unit according to claim 7, wherein the third seal member is supported by a support bracket mounted to the frame, a height of the support bracket being adjustable.

9. The sunroof unit according to claim 8, wherein:
the frame includes a guide rail for guiding the front panel via the stay; and
the support bracket includes a lower end portion secured to the frame at a position on an outboard side of the guide rail, an intermediate portion extending from the lower end portion in an inboard direction, and an upper end portion extending upward from the intermediate portion and supporting the third seal member above the guide rail.

10. The sunroof unit according to claim 9, wherein the support bracket is constituted of a plate member bent along bend lines each extending in a fore-and-aft direction.

* * * * *